United States Patent [19]

Berg

[11] 4,199,952
[45] Apr. 29, 1980

[54] MODULAR SOLAR POWERED HEAT PUMP

[75] Inventor: Charles A. Berg, Buckfield, Me.

[73] Assignee: Owens-Illinois, Inc., Toledo, Ohio

[21] Appl. No.: 950,035

[22] Filed: Oct. 10, 1978

[51] Int. Cl.$^2$ ............... F25B 27/00; F25D 15/00; F25B 17/02; F25B 17/08
[52] U.S. Cl. ........................... 62/2; 62/119; 62/478; 62/480; 126/439
[58] Field of Search ............ 62/2, 106, 119, 478, 62/480; 237/1 A; 126/270, 271

[56] References Cited

U.S. PATENT DOCUMENTS

| | | | |
|---|---|---|---|
| Re. 20,933 | 11/1938 | Altenkirch | 62/2 |
| 1,729,081 | 9/1929 | Miller | 62/480 |
| 2,053,683 | 9/1936 | Schlumbohm | 62/106 |
| 2,138,686 | 11/1938 | Altenkirch | 62/2 |
| 2,144,441 | 1/1939 | Schlumbohm | 62/106 |
| 2,221,971 | 11/1940 | Haywood | 62/2 |
| 3,270,512 | 9/1966 | Webb | 62/2 |
| 3,894,528 | 7/1975 | Stubblefield | 62/2 |
| 4,023,375 | 5/1977 | Chinnappa et al. | 62/2 |
| 4,135,371 | 1/1979 | Kesselring | 62/119 |
| 4,152,901 | 5/1979 | Munters | 62/480 |

*Primary Examiner*—Lloyd L. King
*Attorney, Agent, or Firm*—Kenway & Jenney

[57] ABSTRACT

Disclosed is a solar powered heat pump useful for both heating and cooling building space and for providing refrigeration. The device operates on a chemical effect (adsorption) intermittent heat pump cycle in which the moderately high temperature heat generated by insolation is used to drive the desorber. The device has inherent thermal storage, can be factory built, sealed, and tested, can be electronically controlled for completely automatic operation, and includes a built-in back-up heater which obviates the need for installation of a separate back-up heating system. It can be manufactured from inexpensive materials such as glass, and implodes rather than explodes on failure.

A preferred embodiment of the device is designed as a modular unit which can readily be combined with others of identical design to produce a solar powered battery panel for heating and cooling. This embodiment preferably comprises a tubular enclosure defining a pair of chambers separated by a valve. A first chamber is packed with silica gel (or an equivalent adsorbent material) arranged such that mass and heat transfer through the gel take place rapidly and in comparable time periods. The first chamber is surrounded by a larger diameter, solar radiation transparent housing and the annular space between the chamber and housing is evacuated. The enclosure is mounted together with a diffuse light reflector which focuses sunlight toward the first chamber. Heat exchangers provide thermal communication between respective chambers and a pair of duct portions adapted for connection to a building heat distribution system.

16 Claims, 19 Drawing Figures

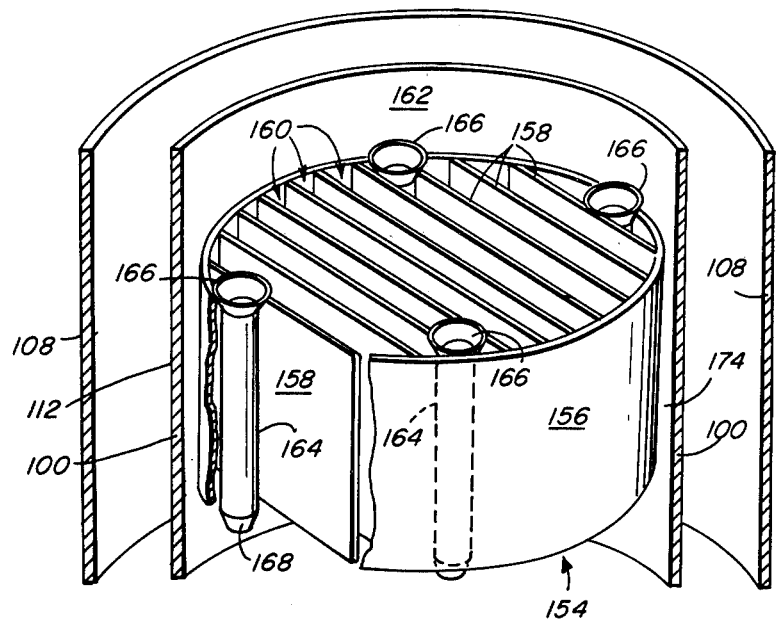
FIG. 16
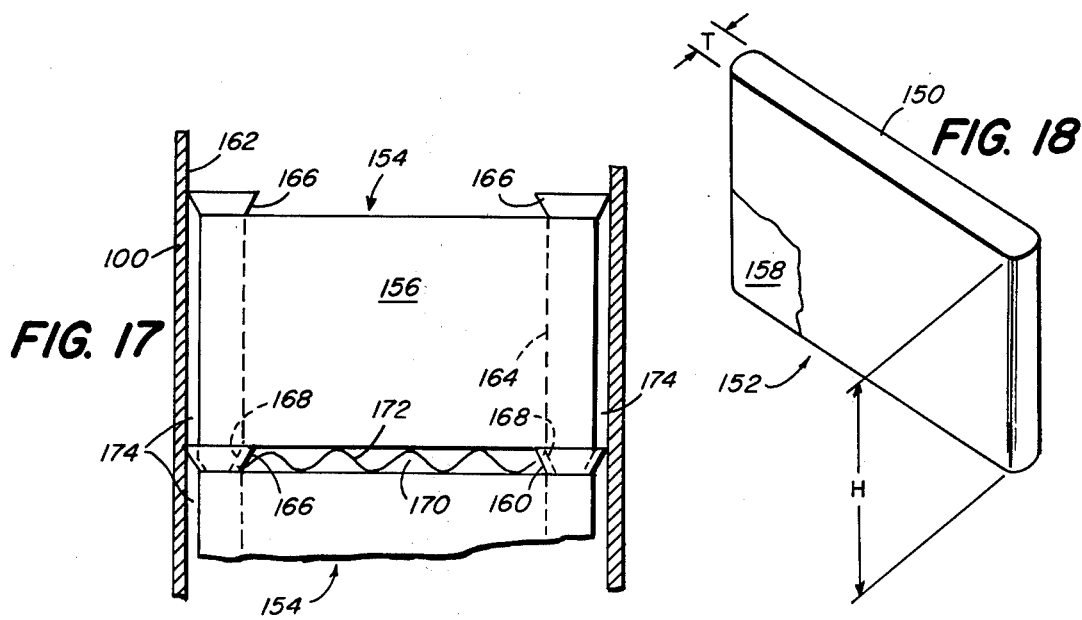
FIG. 17
FIG. 18
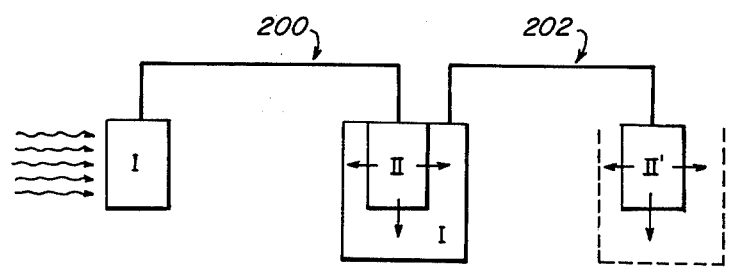
FIG. 19

MODULAR SOLAR POWERED HEAT PUMP

BACKGROUND OF THE INVENTION

This invention relates to a novel heat pump/refrigeration system, which uses solar energy as its primary energy source and is capable of providing the space heating and cooling requirements of a building.

The concepts of using the moderately "warm" heat (approximately 200° F.+), which solar collectors can provide, to heat space and to operate absorption refrigeration units for air conditioning or refrigeration are known. In the main, attempts to exploit these concepts have used the solar collector merely to provide the energy needed to operate conventional heating and cooling equipment. In particular, solar heating has been carried out either by direct transfer of heat from a solar collector to the space to be heated via conventional pipes or ducts, or by using the solar heat to provide moderately "warm" heat to assist the evaporator of an otherwise conventional vapor compression heat pump (the solar assisted heat pump). During the last thirty years, solar cooling has relied primarily upon the concept of using solar heat as the energy supply for conventional (steady state) absorption air conditioning units.

In the known solar heating/cooling systems, it has been necessary to provide thermal storage in a separate facility, typically as sensible heat stored in a water tank or the like. Also, the solar energy has been employed merely to replace or supplement the energy normally generated in conventional heating plants or used to power cooling equipment. The typical solar powered system has thus been rather costly because it has included all of the components of conventional heating and cooling systems plus solar collectors, a thermal storage facility, and special controls. In addition, it has been necessary to install standby heating and cooling capacity to provide for periods of low insolation. This in general requires additional investment in conventional equipment, e.g., an additional furnace or a greatly oversized heat pump. It also requires that one have a secure conventional energy supply during periods of low insolation. Thus, utility connections must be maintained at a capacity sufficient to provide all the required services independently of the solar powered system. These requirements place solar energy at a disadvantge as compared with conventional energy forms, even at the current high prices of energy.

Certain aspects of the design of conventional systems are awkward. For example, whereas the supply of solar energy is inherently intermittent, all conventional heating and cooling equipment, epecially vapor compression heat pumps and absorption air conditioners, are designed to operate on energy supplies which can be drawn upon continuously (e.g. electricity, gas). This however is not born of necessity, but of convenience. Thus, primitive "chemical effect" refrigeration machines (i.e., refrigeration devices in which chemical effects are exploited to replace the mechanical work required in vapor compression units) that operated on an intermittent cycle were replaced in the marketplace by steady state devices such as vapor compression refrigerators or air conditioners and chemical effect machines utilizing cycles such as the steady state ammonia absorption cycle. These latter devices could be operated continuously and were better adapted for use with the controls then available. Examples of intermittant cycle chemical effect devices are disclosed in U.S. Pat. Nos. 1,873,390; 1,910,970; 1,936,039; 2,138,686; 2,622,413; and 3,270,512.

Prior to 1940, a number of refrigeration devices using intermittent chemical effect refrigeration cycles similar to those described in the above-noted patents were produced and marketed commercially. The most famous intermittent refrigerator to have been marketed in the United States was the "Icyball" unit. This device consisted of a closed system having a pair of generally spherical chambers connected by a U-shaped tube, and containing an absorbent/absorbate pair, i.e., a refrigerant such as ammonia (absorbate) and water (absorbent). To use the Icyball unit, one heated the generator ball, which contained a concentrated ammonia solution, to drive off an ammonia rich vapor which migrated to and condensed in the condenser ball. The unit was then placed such that the condenser ball was in an ice chest and the generator ball was outside. As the water in the generator ball cooled, its affinity for ammonia greatly increased (ammonia vapor pressure decreased), and condensed ammonia boiled, extracting heat from the ice chest, and was absorbed in the solution contained in the generator ball. After the refrigerant had been reabsorbed, the "weak liquor" remaining in the condensor ball was drained to the generator ball, and the cycle could be repeated. The tube connecting the two chambers of the Icyball unit had an orifice with constrained the flow of vapor back to the generator ball during the reabsorption (refrigeration) phase of the cycle. This prolonged the refrigeration cycle.

Technological development of intermittent cycle refrigeration machines has been largely stagnant for almost forty years. However, intermittent machines are generally much simpler and less expensive than steady state machines, and since solar energy is inherently an intermittent energy supply, an intermittent machine powered by the sun should not be at a competitive disadvantage with a machine designed for steady state operation.

Waste heat generated by industrial processes has been used to power air conditioning and refrigeration systems which operate on both absorption cycles employing a liquid absorbent material and adsorption cycles employing a solid adsorbent. While these cycles operate in a fundamentally identical manner, with the former it is necessary at some point to pump residual liquid absorbent back to the chamber in the system where desorption takes place. This step is not required in the latter type of cycle since the adsorbents are typically nonvolatile materials such as silica gel, charcoal, or the like.

SUMMARY OF THE INVENTION

The invention provides a modular unit which functions as a heat pump capable of heating, air conditioning, and providing moderately low temperature refrigeration. The unit is powered primarily by solar radiation and operates by executing an intermittent adsorption heat pump cycle wherein refrigerant is cyclically desorbed from an adsorbent material by insolation, condensed, cooled, vaporized, and readsorbed.

The unit comprises a sealed tubular enclosure having a valve positioned between first and second chambers defined by opposite ends of the interior of the tube. A radiation absorptive coating is preferably applied on the exterior surface of the portion of the tube defining the first chamber. A tubular housing, transparent to solar radiation, surrounds and is coaxially arranged with the portion of the tube defining the first chamber. The housing is sealed to provide a subatmospheric pressure zone in the annular space between it and the tube.

A solid adsorbent material is contained within the first chamber, and a refrigerant comprising a condensible adsorbate is contained within the enclosure. The apparatus further comprises means for thermally coupling an area to be heated or cooled with the respective chambers. The thermal coupling means comprises first and second conduit sections designed for connection with fluid circulating conduits such as ducts located within the area to be heated or cooled. The chambers are serviced by first and second heat exchangers. The first heat exchanger comprises a closed loop made of heat conducting material for circulating heat carrying fluid. It has a heat transfer surface within the first chamber in contact with the adsorbent material and a heat transfer surface in the first conduit section of the coupling means. The second heat exchanger exchanges heat between the second chamber and the second conduit section of the coupling means. Finally, temperature and pressure sensors are disposed within each of the first and second chambers. These are adapted for connection to a control means which operates the valve in response to signals received from the sensors.

Preferably, the unit further comprises a diffuse light reflector separated from the transparent housing and disposed opposite the side of the housing facing the sun. The reflector can comprise a concave, specular reflecting surface corresponding to a segment of a cylinder. When plural units are arranged to form a battery panel, the tubes are no more than three tube diameters apart. The cylindrical reflector is preferably separated from the unit such that its focal line lies within the first chamber. The radius of curvature of the reflector surface preferably exceeds the radius of the tube.

The first and second conduit sections of the coupling means preferably comprise duct sections for circulating air, but may comprise pipe sections for connection with a forced hot water heating system in situations where heating is the primary function of the unit. The tubular enclosure is preferably made of glass coated with a radiation absorptive material along the section defining the first chamber. A variety of adsorbent/adsorbate pairs may be employed in the unit, but a preferred system utilizes silica gel and water.

The tubular configuration of the modular unit of the invention has advantages because the volume of the first chamber and its capacity to absorb solar energy vary at different rates as a function of the tube diameter. Since different adsorbent/adsorbate pairs have different heats of adsorption, it is possible to select the diameter of the tubular enclosure so that the quantity of solar energy that can be absorbed during one day's solar exposure is no greater than the amount of energy needed to desorb all the adsorbent material contained within the volume of the tubular chamber. For example, when the adsorbent is silica gel and the refrigerant is water, the collector is capable of collecting more than enough heat (in one winter day at northern U.S. latitudes) to desorb the entire volume of silica gel in the tube if the inside diameter of the tube is about 1.75 inch. If the inside diameter of the collector tube is increased to six inches, its capacity both to absorb solar energy and to contain adsorbent material increases. However, since the volume increase of the tube is greater than its surface area increase, all the silica gel cannot be desorbed in one day's insolation. The unit thus has the capacity to store solar energy during periods of mild weather.

The invention also contemplates that a plurality of the units described above be arranged in an array such that all the first conduit sections are in communication. Such a device, mounted together with diffuse light reflectors of the type set forth above, comprises a solar heating/cooling battery panel having a given heating and cooling capacity. It is possible to provide a plurality of such units to satisfy varying cooling/heating needs.

It is a primary object of the invention to provide a solar powered heat pump suitable for use in space heating and cooling applications which can be manufactured, tested, and packaged in a factory and mounted on location simply by being connected to an electric power supply and a building heating system. Another object is to provide such a modular unit which has built-in solar collection capacity and collection efficiency approaching devices which track the sun during the solar day. Another object is to provide a single modular unit design capable of employing different adsorbent/adsorbate pairs as may be selected for use in different climates. Another object is to provide a unit that can be connected with others of the same type to meet varying heating, cooling, or refrigerating requirements. Still another object is to provide a solar powered heat pump which can be designed to have a selected thermal storage capacity. These and other objects and features of the invention will be apparent from the following description of a preferred embodiment and from the drawing.

BRIEF DESCRIPTION OF THE DRAWINGS

FIG. 16 is a partially cut-away view of a portion of the chamber of the apparatus of FIG. 13 showing a preferred structure for promoting heat and mass transfer within the adsorbent material;

FIG. 17 is a partially cut-away elevation of the chamber of FIG. 16 illustrating how the structures containing the adsorbent material are maintained in position with respect to the outer wall of the chamber and with respect to each other;

FIG. 18 is a perspective view of a wafer of adsorbent material as it would appear in the wells of the structure of FIGS. 16 and 17; and FIG. 19 is a diagram illustrating how the process and apparatus of the invention can be staged to produce low temperature refrigeration.

Like reference characters in the respective figures of the drawing indicate corresponding parts.

DESCRIPTION OF THE PREFERRED EMBODIMENT

The System

Figure 1:
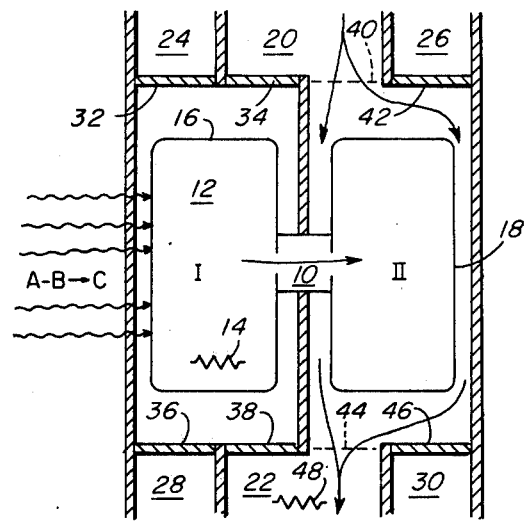
FIGS. 1–4 are diagrammatic illustrations useful in describing the heating cycle of the solar powered apparatus of the invention.
Figure 2:
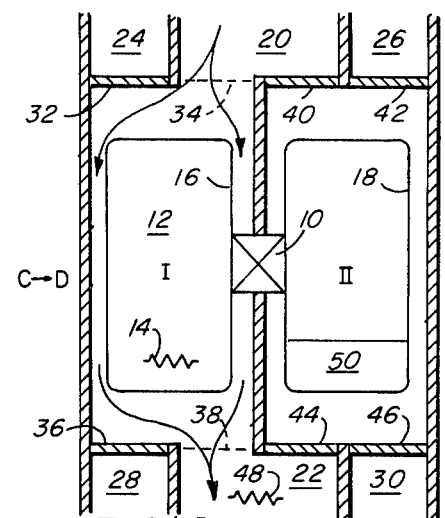
Figure 3:
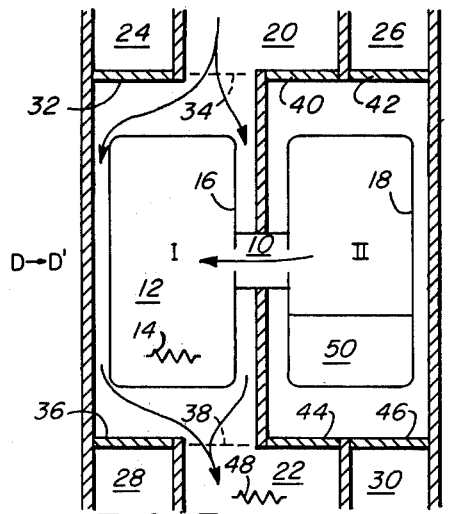

Several fundamentally different types of devices for moving heat are known in the art. These include vapor compression systems and so called "chemical effect" systems, which may be further categorized as continuous cycle systems or intermittent cycle systems, and as absorption or adsorption systems. All such devices involve heat transfers with thermal reservoirs at at least three different temperatures: a low temperature reservoir which acts as a sink from which heat is extracted, a medium temperature reservoir to which heat is supplied, and a high temperature reservoir from which heat is also extracted. In refrigerators and air conditioners, the low temperature reservoir is what is cooled, and heat is dumped into the medium temperature reservoir. In heat pump heating systems, the medium temperature reservoir is what is being heated and the low temperature reservoir is the cold outdoor air or other cold thermal sink which supplies the heat. When the objective is to remove heat and thereby cool a given area, these devices are referred to as refrigerators or air conditioners. When the objective is to provide the heat necessary to warm an area, they typically are referred to as heat pumps. As used herein, the term "heat pump" will refer generically to devices designed for either purpose.

Whenever a source of heat is available having a temperature higher than the temperature of the reservoir of intermediate temperature into which heat is to be moved, it is possible both in principle and practice to exploit the inherent thermodynamics of the situation to effect heat pumping, and thus to deliver more heat to the intermediate temperature reservoir than is extracted from the highest temperature reservoir. In chemical effect heat pumps, that is, systems wherein chemical effects such as absorption or adsorption replace the mechanical work done in vapor compression systems, the high temperature thermal reservoir typically comprises a boiler or a source of exhausted steam. In the device here under discussion, the high temperature reservoir is the solar generated heat.

The instant invention was developed in response to the realization that it should be possible to design an intermittent cycle heat pump device which could be used for both heating and cooling and could be powered by a heat source at temperatures that can be generated within presently available solar collectors. In the heating mode, the apparatus delivers more heat to the medium temperature reservoir than is collected from insolation. Thus, the device can meet the heating needs of a given thermal sink, e.g. a given building space, by drawing on a solar collection capacity which would be unable in one day to collect sufficient heat to maintain the temperature of the building if the solar heat were simply delivered in the conventional manner. In the cooling mode, heat is extracted from a sink to be cooled such as building space (now serving as the low temperature reservoir) and dissipated into the hotter exterior environment (now functioning as the intermediate temperature reservoir).

With "steady-state" heat pumps, heat exchange at any given point in the system always takes place with the same reservoir. In the intermittent machine, the reservoirs with which given points in the system exchange heat must be intermittently changed. Thus, intermittent cycles always include two heat exchanges with a single point in the system: one which removes heat from a low temperature reservoir, and one which removes heat from a high temperature reservoir. In the apparatus disclosed herein, the switching is done using a system which directs heat carrying fluid such as air or water from the appropriate reservoir in heat exchange relation with various points in the system. Advantageously, the heat pump can be switched from a heating to a cooling mode simply by appropriately directing the fluid flow.

The discussion which follows is in the main directed to heating and cooling building space. This use of the system and apparatus of the invention has economic significance and is a preferred application of this technology. However, it will be obvious to those skilled in the art that the system may readily be adapted to heat reservoirs other than building space and to provide refrigeration, as opposed to air conditioning. The following description should accordingly not be construed as limiting.

The heat pump will now be described with reference to FIGS. 1–11, which broadly illustrate its basic nature and function. The apparatus comprises a pair of chambers (labeled I and II) connected by a wide opening valve 10, which together comprise a sealed, pressure tight assembly. Chamber I is packed with an adsorbent material 12 such as silica gel. The sealed assembly also contains a condensible adsorbate vapor (working refrigerant) selected for its ability to readily exothermically adsorb into the material in chamber I. Chamber I is in thermal communication with a solar energy collector or itself functions as a solar energy collector. Preferably, Chamber I contains a nonsolar powered backup heater 14 which is used to supplement insolation during cloudy or severely cold weather.

Chambers I and II are each provided with a heat exchanger operable to exchange heat between the chamber and either the area to be heated or cooled (e.g., building space) or the area from which heat is extracted in the heating cycle and into which heat is dissipated in the cooling cycle. In FIGS. 1–11, for simplicity and clarity, the surface area across which heat exchange is effected is illustrated merely as the walls 16 and 18, respectively, of chambers I and II. Heat exchange with air from the interior of a building is accomplished by passing the air along duct 20, over either chamber I or II (as required), and back to the building through duct 22. Heat exchange with air from the environment is accomplished by passing air through either of ducts 24 and 26, over chamber I or II, and back into the environment through duct 28 or duct 30. A system of baffles illustrated simply as retractable members 32, 34, 36 and 38 make it possible to thermally isolate chamber I and exchange heat between chamber I and either air from the building or from the environment. After heat exchange, the air is directed either back outside through duct 28 or to the interior of the building through duct 22. Similarly, a baffle system comprising retractable memers 40, 42, 44, 46 operates to thermally isolate chamber II and provides the same degree of flexibility of heat exchange. It is preferred that the apparatus also include means to control the rate of heat exchange with chamber I. One method for accomplishing this (See items 94 and 96 of FIG. 11) is to provide air movers that can be controlled to vary the volume of air which is passed about the heat exchanger of chamber I. Other conventional means for controlling heat exchange will be obvious to those skilled in the art. Preferably, the apparatus also comprises a booster heater 48, which functions under certain conditions to maintain the interior temperature of the space to be heated.

It should be noted that FIGS. 1-11 are highly schematic and are set forth in order to simplify the discussion, which follows, of the operation of the cycles and to illustrate basic features of the system.

Chambers I and II may take any desired shape. Heat exchange with the chambers can be accomplished by various well-known techniques using established technology, e.g., a closed heat transfer system for circulating a refrigerant fluid such as a halocarbon can be employed. A variety of different types of solar energy collectors may be used, and various methods of delivering heat from the collector to the interior of the chamber are possible. The baffle system can take any operable form. The booster and backup heaters need not necessarily comprise the illustrated electrical resistance heaters, and, in fact, may be entirely omitted in many situations.

At the beginning of the cycle, adsorbate (refrigerant) within the two-chambered enclosure is adsorbed in the adsorbent material disposed in chamber I. Broadly, during the course of the cycle, the adsorbate vapor is desorbed from the adsorbent material by collected solar heat and allowed to pass through the valve into chamber II where it is condensed. During the night, heat is provided to chamber II to vaporize the condensate; the liberated vapor passes back through the valve 10 and is readsorbed in adsorbent material 12 until the original state of the system is restored.

Heating Cycle

Figure 12:
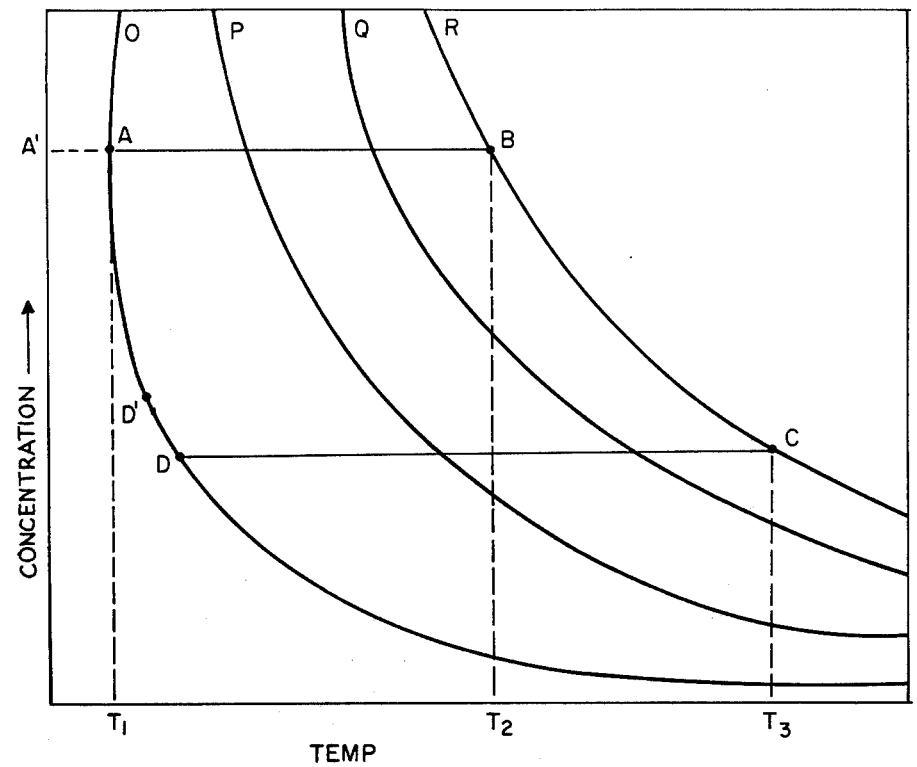
FIG. 12 is a graph of the mass ratio of adsorbate to dry absorbent material versus temperature useful in describing the cycle employed in the apparatus and process of the invention.

FIG. 12 is a graph of the concentration of the adsorbate in the adsorbent material 12 in container I versus temperature illustrating certain aspects of the cycle. Lines O, P, Q, R comprise constant refrigerant vapor pressure lines (isobars) above the adsorbent material. At the beginning of the cycle (e.g., shortly after dawn), at point A, the concentration of refrigerant vapor in the adsorbent material is at its peak (A', FIG. 12) and the temperature ($T_1$) of the adsorbate filled absorbent material is equal to or lower than the interior temperature of the building. As insolation begins, with valve 10 closed so that no refrigerant can escape chamber I, the temperature within chamber I is raised to $T_2$ (A-B, FIG. 12). The vapor pressure of the refrigerant increases. Next, as insolation continues, valve 10 is opened and refrigerant vapor desorbes from adsorbent material 12, passes through the valve, and enters chamber II (B-C). By opening baffles 40 and 44, air from the interior of the building passes in heat exchange relation to chamber II, extracts heat of condensation from the refrigerant vapor resulting in the buildup of condensate 50, (FIGS. 2-4) and is returned to heat the building. As long as insolation continues and some refrigerant vapor remains adsorbed in adsorbent material 12, vapor is continually condensed in chamber II, and its heat of condensation is used to supply heat to the building through duct 22 (FIG. 1). Ideally, the desorption of adsorbent material 12 in chamber I is done at constant vapor pressure (B-C, in FIG. 12) for maximum thermodynamic efficiency. Such constant pressure desorption may be approached by control of valve 10. Thus, during insolation, the concentration of adsorbed refrigerant steadily decreases, and the temperature within chamber I increases to its highest point in the cycle ($T_3$).

In the next step of the cycle (FIG. 2 and C-D of FIG. 12), valve 10 is closed to prevent migration of vapor from chamber II, and the adsorbent material in chamber I is cooled. With baffles 34 and 38 open, heat is exchanged between air from the interior of the building and the adsorbent material. The warmed air is delivered to heat the building via duct 22. As a result of the cooling, as shown in FIG. 12, the vapor pressure of the refrigerant above adsorbent material 12 decreases. In addition to the sensible heat extracted from adsorbent material 12, desorbed vapor which remains in the interstitial volume of chamber I is readsorbed, and a certain amount of heat of adsorption is liberated and delivered to the building.

In the next step of the cycle (FIG. 3 and D-D' of FIG. 12) with baffles 40, 42, 44, and 46 closed so that chamber II is thermally isolated, and with baffles 34 and 38 open so that heat exchange between interior space of the building and chamber I can be continued, valve 10 is momentarily opened. Because of the low vapor pressure in chamber I, vapor flash distills from the condensate in chamber II, passes through the valve 10, and is adsorbed in adsorbent material 12. The adiabatic nature of the flash evaporation results in cooling of the condensate 50 in chamber II to a temperature well below that of the atmosphere. As vapor is adsorbed in chamber I, heat of adsorption is liberated and delivered to heat the building via duct 22.

At this point in the cycle (D', FIG. 12), a mass of condensate having a temperature below the atmospheric temperature is present in chamber II, and the adsorbent material 12 in chamber I has a substantial as yet untapped capacity to adsorb additional refrigerant vapor. Accordingly, with baffles 34, 38, 42 and 46 open, air is passed from the interior of the building in heat exchange relation with chamber I, warmed, and delivered back to the building through duct 22. Air from the atmosphere enters through duct 26, circulates in heat exchange relation with chamber II to give up heat required for vaporization the condensate 50, and exists via duct 30 back into the atmosphere. As heat of vaporization is absorbed from exterior air, vapor migrates from chamber II through the valve 10 and into the adsorbent material 12 in chamber I. A small portion of the resulting heat of adsorption is used to heat incoming vapor up to the temperature of the adsorbent material. The remaining heat of adsorption is delivered to the building. Preferably, adsorption of liberated vapor into adsorbent material 12 during this stage of the cycle is done at constant vapor pressure as this promotes thermodynamic efficiency (Note D'-A passes along isobar in FIG. 12). This mode of operation can be accomplished by controlling the rate of heat exchange between the air and the adsorbent material in chamber I. Such control can be achieved by varying the area of the heat exchange surface, by varying the quantity of air passed over a given area of heat exchange surface per unit time, or by other well known means.

During latter portions of the cycle, e.g., as the cycle approaches point A in FIG. 12, the temperature of the adsorbent material may fall below the temperature of the interior of the building in very cold weather. In this case, booster heater 48 is actuated to warm the air exiting the apparatus through duct 22.

Quantitative Example of Heating Cycle

For purposes of quantifying the heat transfers and capabilities of the heating cycle of the apparatus, it will be assumed that a building is to be heated with a circulating warm air stream, that the cold air return may fall to 55° F. during nightime service, and that the temperature of warmed air used to heat the building can be reduced to 75° F. for brief periods. The temperature of the outdoor air is assumed to fall to 25° F. during the night. The cycle starts with the temperature of the adsorbent material ($T_1$) at 60° F. If the adsorbent/adsorbate pair used is silica gel/water, the starting vapor pressure in chamber I will be 0.01 in. Hg. and the maximum temperature attained in the adsorbent material ($T_3$) will be 255° F.

During stage A-B, with valve 10 closed, collected solar energy is delivered to the adsorbent material 12 until the vapor pressure in chamber I reaches 2.00 in. Hg, i.e., the pressure required to condense water vapor in chamber II at a temperature of 101° F. During B-C, vapor migrating through valve 10 is condensed in chamber II at this temperature, and the heat of vaporization is delivered to the building as described above.

In stage C-D, the initially 255° F. adsorbent material is cooled by building air with the valve 10 closed. One object of this step is to reduce the vapor pressure in chamber I to about 0.10 in. Hg, which pressure corresponds to the saturation pressure of ice at 18° F. In addition, the sensible heat stored in the adsorbent is used to heat the building.

In stage C-D', flash evaporation is employed to freeze the liquid water in chamber II and to reduce its temperature to 20° F. As this temperature is below the triple point of ice, no liquid phase will remain in chamber II. It is possible to freeze water to this temperature because of the low vapor pressure in chamber I.

Next, in process D'-A, heat is transferred from the outside atmosphere, here at 25° F., and used to vaporize the 20° F. ice in chamber II. The heat thus absorbed in chamber II supplies the heat of sublimation of the ice, and the generated vapors are readsorbed in chamber I. Their heat of adsorption, plus the sensible heat liberated by controlled cooling of the gel at constant vapor pressure, is delivered to the building. As the temperature of the gel falls below 80° F. and descends towards 60° F. (Point A along constant vapor pressure line O in FIG. 12), supplementary booster heat may be required to prevent the temperature of the warm air entering the building from falling below 75° F.

The heat transferred to and from the system is calculated assuming the specific heat of silica gel, with water adsorbed at a concentration X, to be:

$$C_p = 0.23 + 0.5X \text{ BTU/lb.°F.}$$

The adsorbed water vapor is assumed to have the same specific heat as ice. The heat of adsorption of water vapor on silica gel is equal to 1,300 BTU/lb. of water. This is an average value derived from published data and represents adsorption in the range of 10% concentration or less. In process A-B and C-D, a small amount of vapor will adsorb or desorb to fill the intersticial volume among particles of silica gel in chamber I. This mass of vapor is considered negligible here, and these processes are assumed to take place at constant concentration. Heat flows for each stage of the cycle calculated on the basis of the foregoing appear in Table I set forth below.

TABLE I

Heat Transfer During the Cycle (BTU/lb. of Silica Gel, Dry Basis)

| Process | Vessel I | Comment | Vessel II | Comment |
|---|---|---|---|---|
| A-B | +21.08 | Solar heating of silica gel from 60° F. to 155° F. | 0 | — |
| B-C | +156.00 | Solar heating of silica gel from 155° F. to 255° F., and desorption of 0.10 pound of water per pound of gel | −103.66 | Condensation of water at 101° F. in II, with heat of condensation delivered to the building |
| C-D | −22.325 | Cooling of silica gel from 255° F. to 160° F. with heat delivered to building | 0 | — |
| D-D' | −33.96 | Vapor generated in II adsorbed in I; heat of adsorption delivered to building at 118° F.+; also sensible heat extracted from gel delivered to building | 0 | Adiabatic flash evaporation and formation of ice at 20° F., saturated |
| D'-A | −1221.41 | Vapor adsorbed in I and heat of adsorption given to building along with sensible heat extracted from gel. Chamber I cools from | +100.47 | Heat received from atmosphere at 25° F. |

TABLE I-continued
Heat Transfer During the Cycle (BTU/lb. of Silica Gel, Dry Basis)

| Process | Vessel I | Comment | Vessel II | Comment |
|---------|----------|---------|-----------|---------|
|         |          |         |           | 118° F. to 60° F. Below 80° F. supplementary heat may be required. |

From the foregoing Table it can be appreciated that the net heat transfer into the system is 283.55 BTU and that heat transfer out is 282.36 BTU. These figures differ only by 0.42%, and demonstrate that the assumptions on which the calculations are based are quite reasonable. Total heat delivered to the building per pound of silica gel is 282.4 BTU. Heat input from the solar collector is 177.1 BTU. Accordingly, the coefficient of performance of this cycle is 282.4/177.1=1.59: the cycle delivers 59% more heat to the building than it collects from the sun.

As is also obvious from the foregoing, the system inherently incorporates the capacity for thermal storage, i.e., night-time heating is done by extracting heat from the cold atmosphere to vaporize condensate (or sublimate) and delivering heat of adsorption produced in chamber I to the building. The thermal sink used in conventional solar heating systems comprising a tank of water or the like is not needed. In addition, the system has the ability to store heat by progressively accumulating condensate in vessel II during periods of mild nighttime weather. For example, if over a two-day period a sunny day and mild night were followed by a heavily overcast day and a very cold night, condensate generated during the sunny day but not vaporized during the mild night would be retained in chamber II. It would then be supplemented by additional condensate generated on the following cloudy day, and the total would be available to heat the building on the following cold night. To best exploit this longer term thermal storage capability, the quantity of adsorbent and adsorbate enclosed in the system should be such that a maximal winter day solar exposure is insufficient to desorb the fully charged adsorbent material. In this circumstance, significant flexibility in thermal storage is provided.

For periods when insolation is insufficient to produce enough heat to maintain the temperature of the building, the heat necessary to desorb the adsorbent material in chamber I can be provided in part by nonsolar powered backup heater 14 powered, for example, electrically.

Two of the more important variations possible in the foregoing cycle involve the regulation of pressure and temperature via control of heat transfer so that (1) the cycle can take optimum thermodynamic advantage of the outdoor air temperature and (2) adsorption and desorption (particularly the former) can be conducted along an isobar of vapor pressure.

The first point is important because the temperature of the condensate must be maintained below the outdoor air temperature in order to maximize the coefficient of performance of the cycle. Obviously, the ratio of the amount of heat delivered to the building to the amount of heat collected from the sun increases as the latent heat absorbed by the condensate or sublimate during stage D'-A is increased. For this reason it is preferred to use a refrigerant which can be both condensed and frozen, so that both the heat of condensation and the heat of fusion may be utilized to heat the building. If the condensate is to be vaporized or sublimed by receiving heat from outside air it must be colder then the air. The lowest temperature it can attain is dependent on the vapor pressure of the cooled adsorbent in chamber I and on controlling the valve so that vapor is produced at substantially constant temperature.

The second point is important because operation along an isobar of adsorption enables a closer approach to reversible operation. This, in accordance with well known principles of thermodynamics, results in higher efficiency.

The cycle described above is a hybrid as compared with most solar heat pump designs in that it may use booster heating in the final (D'-A) stage of the cycle. The total energy required for booster heating is quite small compared to the total heat delivered to the building. An exact calculation of the booster energy requires somewhat detailed knowledge of the system and the ambient air temperatures. However, the booster energy required to maintain the warm air inlet temperature at 75° F. when and if the temperature in vessel II falls below 80° F. towards 60° F. has been estimated to be approximately 25 BTU/lb. of silica gel, or about 9.4% of the total heat delivered to the building. Assuming this small amount of energy were actually needed, it could easily, and relatively economically, be provided by electrical resistance heater 48.

Cooling Cycle

It is an important aspect of the instant invention that merely by modifying certain aspects of the foregoing cycle, the apparatus can be used to provide air conditioning or moderately low temperature refrigeration. The manner in which this can be accomplished is described with reference to FIGS. 5–10.

Figure 5:
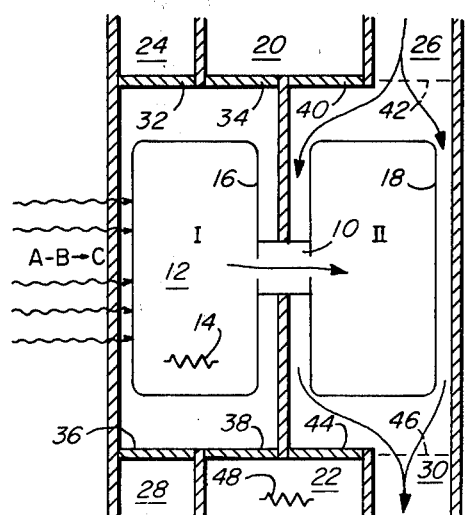
FIGS. 5–8 are diagrammatic illustrations similar to those of FIGS. 1–4 illustrating the cooling cycle of the apparatus.
Figure 6:
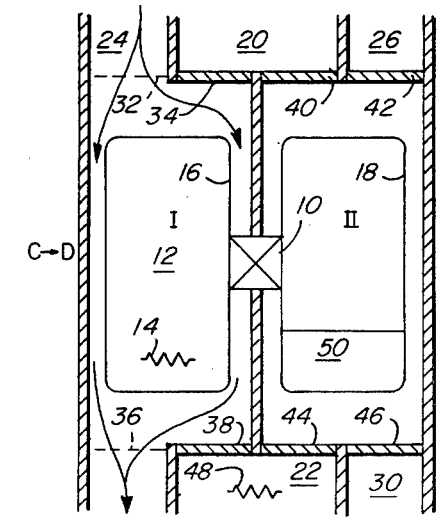
Figure 7:
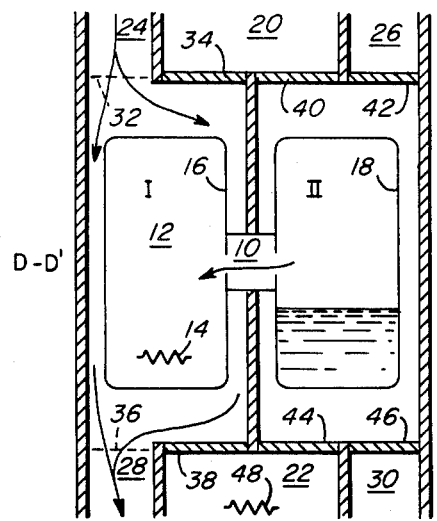

In the first stage of the cycle (A-B), with valve 10 closed, insolation heats the refrigerant-filled adsorbent material 12. When the vapor pressure in chamber I has increased to a level where the vapor can be condensed at a temperature above the outdoor air temperature, valve 10 is opened and, as insolation proceeds, refrigerant vapor passes through the valve, enters chamber II, and is condensed (FIG. 5). The heat of condensation of the refrigerant vapor is dissipated into the environment by heat exchange with outdoor air entering through duct 26 and open baffle 42, passing about the heat exchanger of chamber II, and exiting through open baffle 46 and duct 30. In the next stage of the cycle (C-D), at a time when the intensity of insolation has decreased, the valve 10 is closed, baffles 32 and 36 are opened, and outdoor air entering through duct 24, passing about the heat exchanger of chamber I, and exiting through duct 28 cools the now desorbed adsorbent material 12, thereby lowering the vapor pressure of the refrigerant in chamber I (FIG. 6).

In stage D-D' (FIG. 7), with baffles 40, 42, 44, and 46 closed so that chamber II is thermally isolated, valve 10 is momentarily opened. Because of the low vapor pressure in chamber I, flash evaporation from condensate 50 occurs in chamber II, and the condensate is cooled to a temperature below the temperature which is to be maintained by refrigeration e.g., below the interior temperature of the building. The heat of adsorption liberated when the flashed refrigerant vapor is readsorbed into adsorbent material 12 is dissipated into the atmosphere by heat exchange with air entering through duct 24 and open baffle 32, and exiting through open baffle 36 and duct 28.

Figure 8:
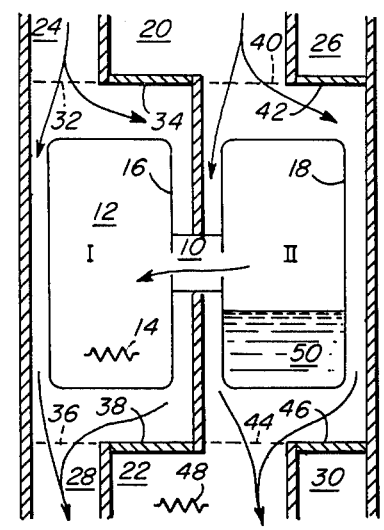

At point D' in the cycle, the low temperature condensate 50 in chamber II represents a reservoir of cooling capacity that can be tapped at any time to extract heat from the interior of a building, refrigerated compartment, or the like. Thus, air from the interior of the building is introduced via duct 20 and open baffle 40, cooled as it gives up heat to vaporize (or sublime) cold condensate 50 in chamber II, and returned to the interior of the building via open baffle 44 and duct 22 (FIG. 8). Heat picked up by the condensate 50 in chamber II is absorbed as heat of vaporization. The refrigerant vapor migrates through the valve 10 and is readsorbed into adsorbent material 12 in chamber I. Again, heat of adsorption is dissipated into the atmosphere by heat exchange with exterior air entering via duct 24 and exiting via duct 28. When all condensate has been evaporated from chamber II, the system must be charged by additional insolation before additional cooling can occur.

As will be apparent from the foregoing description of the cooling cycle, the state where cooling capacity can be exploited (D'-A) cannot occur simultaneously with the insolation/desorption stage (A-B-C). Since the time when air conditioning capacity is most needed typically falls closely behind the daily period of most intense insolation, it is apparent that provision must be made for delaying the exploitation of the cooling capacity or for enabling cooling to occur during periods other than when the cycle is in stage D'-A depicted in FIG. 8.

While it is within the scope of the present invention to provide a single large unit constructed in accordance with the foregoing principles to both heat and cool space in a building as required, the preferred method of exploiting the process and apparatus of the invention, at least as it applies to space heating and cooling, is to provide relatively small devices, a plurality of which are installed to suit the needs of a particular building and its surrounding climate. Some of the advantages of such an approach are set forth in detail below. One of the significant advantages is that such a modular approach provides for flexibility in utilization of the cooling cycle. For example, during periods of insolation, half of the units could be undergoing the desorption stage depicted in FIG. 5 (A-B-C) and building up cooling capacity in the form of condensate for future use, while remaining modules could be in stage D'-A providing air conditioning (FIG. 8). In order to prevent the adsorbent material 12 in chamber I from heating up and interfering with the cycle, solar exposure would be prevented by a shield or the like or the collected solar heat would be rapidly dissipated into the atmosphere. This approach would require twice the cooling capacity actually necessary to maintain the air conditioned temperature of the building. However, in regions where winters are severe, such excess capacity would already be present to deal with the winter heating requirements.

Another method of exploiting the cooling capacity is to operate the system in the desorption stage of the cycle only at periods of maximum insolation, e.g., for a 4-5 hour period around noon, to run the cycle rapidly through stages C-D-D', and then to utilize the built-up cooling capacity until the next day when insolation again becomes intense. In situations where the largest load on the system comes from winter heating, it will be possible to satisfy summer air conditioning requirements by these and other means.

Figure 9:
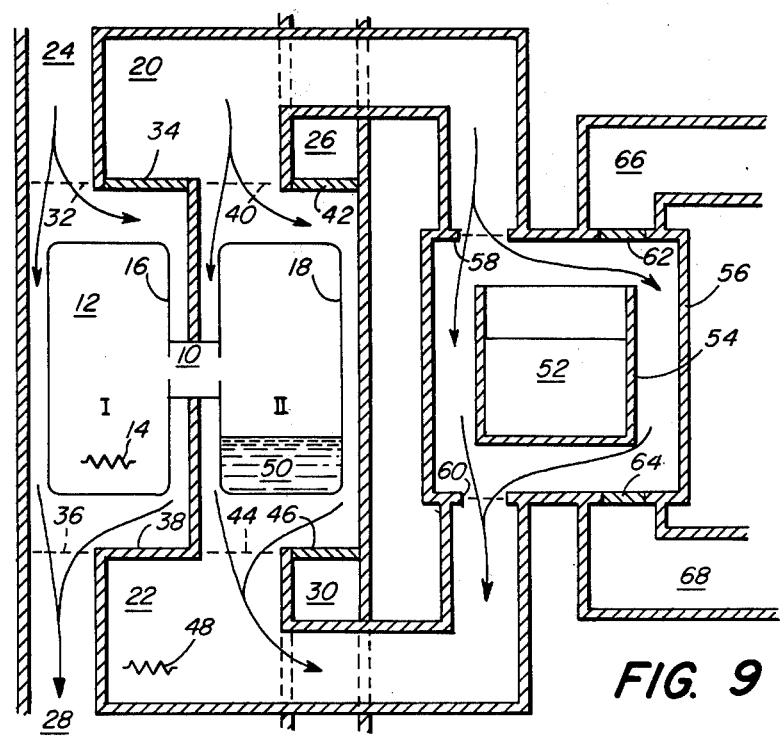
FIG. 9 is a diagram illustrating one method of storing cooling capacity during periods of low insolation for use in providing refrigeration during subsequent periods of intense insolation.
Figure 10:
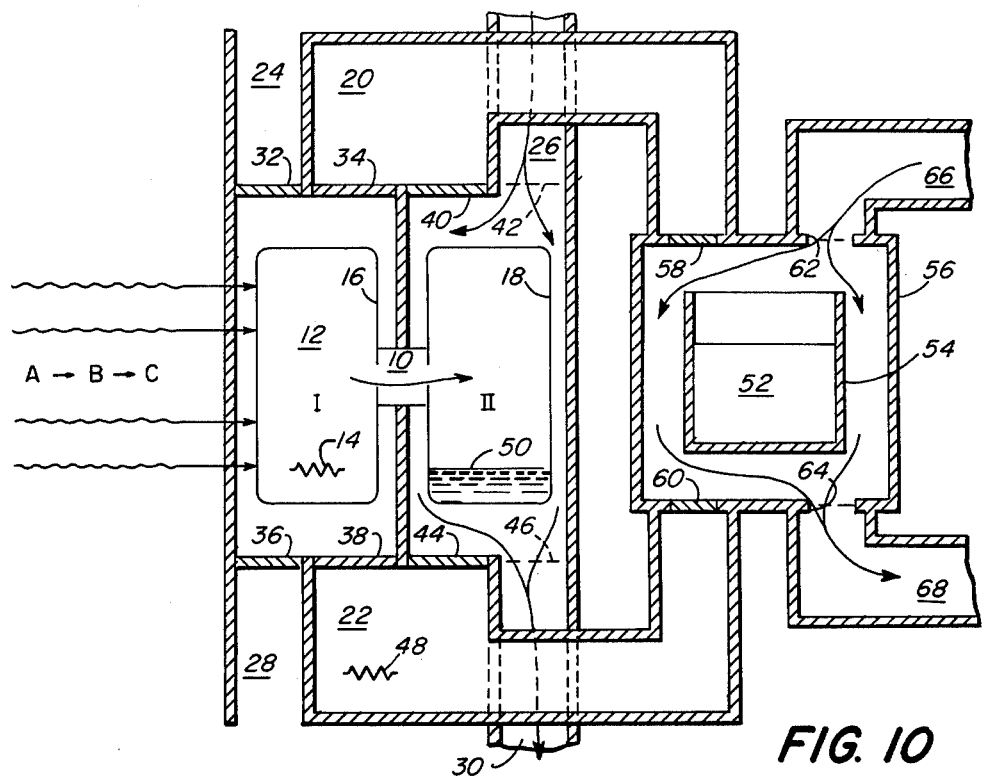
FIG. 10 is a diagram illustrating a method of utilizing the stored cooling capacity.

In hotter climates where the load on the system for air conditioning in summer is greater than the heating burden during the winter months, the foregoing methods cannot be utilized unless one is willing to pay for significantly more cooling capacity than is actually necessary to cool the building. In such a climate, it is preferred to utilize the cooling capacity during the night to, for example, make ice or otherwise, "store cold" to be used during subsequent periods of intense insolation. FIGS. 9 and 10 schematically illustrate apparatus suitable for exploiting this approach.

In FIG. 9, the cycle is depicted in stage D'-A. The condensate 50, at subfreezing temperatures, is exchanging heat via a circulating fluid flow with water 52 in reservoir 54. As heat is lost to the circulating fluid, refrigerant vapor forms in chamber II, migrates through the valve 10 into chamber I, and is adsorbed, heat of adsorption being dissipated by heat exchange with outdoor air. As shown, reservoir 54 is enclosed in a housing 56 fitted with baffles 58, 60, 62, 64. Duct system 66, 68 enables air from the interior of the building to be passed in heat exchange relation with reservoir 54 and returned. Again, various well-known means for optimizing heat exchange between circulating fluids and reservoir 54 may be employed.

With this arrangement, during the night, the cooling capacity of condensate can be stored by making ice. As shown in FIG. 10, during the next day when demand for air conditioning increases and heavy insolation is best used to build up more condensate 50, baffles 58, 60 are closed and baffles 62, 64 opened to exchange heat with reservoir 54. Heat absorbed from the air is used as heat of fusion of the melting ice. Obviously, other means of storing cooling capacity known to those skilled in the art could be used in place of the cyclic ice formation and melting described here. Thus, the foregoing description should be regarded as merely exemplary.

Controls

Figure 11:
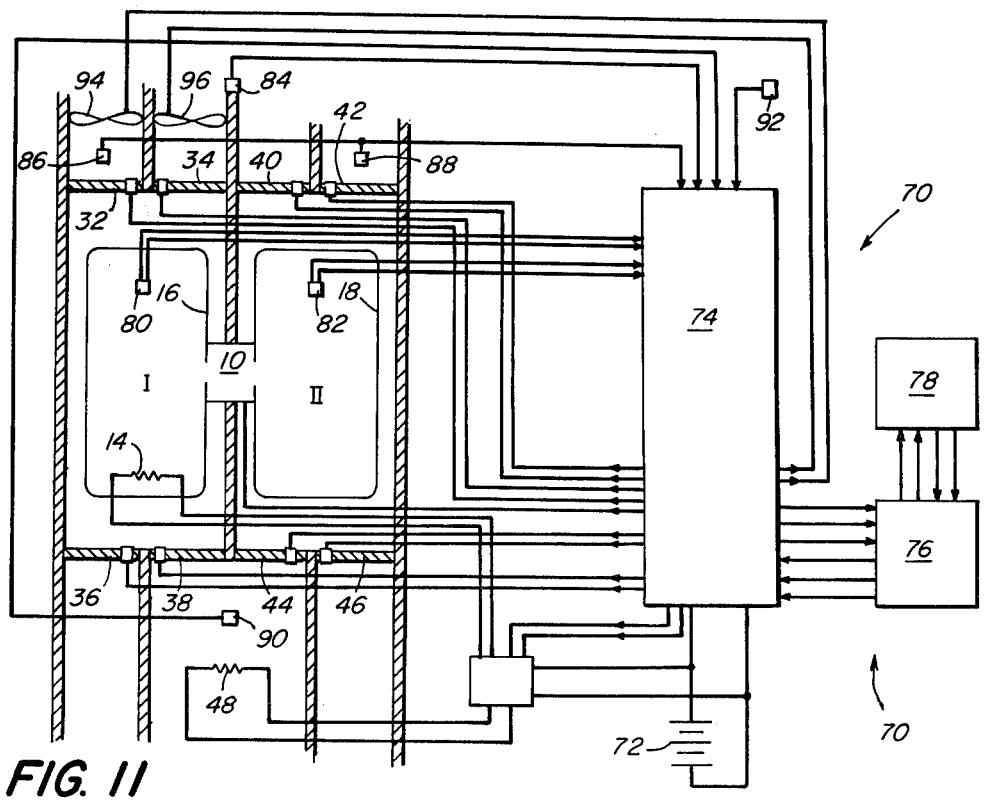
FIG. 11 illustrates an exemplary system for controlling the apparatus of the invention.

A most important feature of the process and apparatus of the invention is that it is readily amenable to being controlled so that its operation is completely automatic. Further, it is possible to control operation of the cycle to promote optimum efficiency. Various levels of sophistication of control are possible. FIG. 11 depicts one possible control system which enables completely automatic operation of both the heating and cooling cycle.

The system features a control means generally designated at 70 comprising an input and output (I/O) network 74, logic network 76, and memory 78. The logic and memory can be embodied, for example, as a suitably programed microprocessor. Logic network 76 is coupled (by way to I/O network 74) to temperature and pressure sensors 80, 82 disposed respectively in chambers I and II, indoor air temperature sensor 84, outdoor air temperature sensors 86, 88, the heated air stream temperature sensor 90, and thermostat 92. Logic network 76 is also coupled by way of I/O network 74 to valve 10, booster heater 48, backup heater 14, and baffles 32, 34, 36, 38, and 40, 42 44, 46. Lastly, network 76, through I/O network 74, is also coupled to means for varying the rate of heat exchange with the adsorbent material contained in chamber I, here embodied as a pair of impellers 94, 96.

In operation, when the temperature of the indoor air sensed by sensor 84 is less than the temperature set at thermostat 92, control means 70 initiates a heating cycle wherein, during insolation, when a predetermined threshold pressure is sensed by sensor 80, valve 10 and baffles 40 and 44 are opened and heat is exchanged between building air and the condensing vapor in chamber II. As insolation decreases and the temperature and vapor pressure sensed in chamber I reach a selected level, the control means 70 closes valve 10 and baffles 40 and 44, opens baffles 34, 38, and actuates impeller 96. At that time, heat exchange occurs between interior air and the adsorbent material in chamber I, thus providing additional heat to the building. When, as determined on the basis of inputs received from sensors 80, 86 and 88, the vapor pressure in chamber I has reached a predetermined level (low enough to enable cooling of the condensate in chamber II to a temperature below that of the outside air) control means 70 opens valve 10 intermittantly, providing progressive cooling of the condensate by flash evaporation. During this portion of the cycle, heat of adsorption is removed by passing interior air about the heat exchange surface associated with chamber I. When the temperature within chamber II has reached a selected low level (as detected by sensor 82), control means 70 opens valve 10 and baffles 42, 46. Outside air is then forced by a fan (not shown) about chamber II where it provides heat of vaporization for the cold condensate. Also during this stage of the cycle, the fluctuating vapor pressure in chamber I is sensed by sensor 80, and impeller 96 is actuated in response. The rate of heat removal from chamber I is thus controlled so that, as adsorption continues, the vapor pressure above the adsorbent material remains substantially constant. If, during latter stages of the cycle, temperature sensor 90 indicates a building input temperature below the selected temperature input of thermostat 92, the control means 70 actuates booster heater 48.

When the interior air temperature as sensed by sensor 84 is greater than the temperatures selected at thermostat 92, the control means 70 may initiate a cooling cycle. As discussed in detail above, the cooling cycle operates fundamentally identically to the heating cycle, except that different baffles are opened during the various stages of the cycle, and the temperatures at which heat exchanges occur will differ slightly. Thus, heat removed from the chambers is dissipated into the atmosphere rather than into indoor air, and heat of vaporization is supplied to the condensate in chamber II in the fourth stage of the cycle from indoor air or from a circulating fluid stream as depicted in FIGS. 10 and 11.

As will be obvious to those skilled in the art, other different control scheme and levels of sophistication will be possible. Thus, it is contemplated that short term weather forecast data could be stored in a portion of memory 78 and used to vary certain parameters in the system in preparation, for example, for a very hot or very cold upcoming period. For the preferred modular approach to practicing the invention, the duct system or other fluid carrying heat transfer system of respective modular units are preferably connected in series so that one baffle system serves at least several units, and a single baffle control output would be common to many units. Among a set of units placed such that their operation is functionally equivalent, a set of temperature and pressure sensors 80 and 82 need be included only in one, as these would provide the control means with data representative of all the units in the set. In regions where the cooling capacity storage technique illustrated in exemplary fashion in FIGS. 9 and 10 is employed, the control means could of course be adapted to regulate this aspect of the apparatus.

A preferred control means 70 includes a programable microprocessor sold under the trademark SUN-KEEPER, manufactured by Andover Controls. The microprocessor is capable of dealing with 64 independant inputs and of operating 32 outputs to on/off control switches. Ideally, the physical characteristics of the adsorbent/adsorbate pair are stored in the memory of the controller in parametric form (parametric representation of adsorption data is well known). A stored control program determines the optimal operating conditions for the device, e.g., the temperature to which the flash evaporation is to proceed and when to stop vaporizing condensate. Also, weather data, e.g., a three day prediction of night-time and day-time temperature and insolation, could be supplied to the controller by a telephone link and updated daily. The controller could then determine the daily optimal operating conditions for the heating or cooling cycle, taking into account the cost of electrical booster heating, the cost of using electrical backup energy, and opportunities to exploit mild night-time conditions to accumulate condensate for subsequent more severe weather.

Adsorbent/Absorbate Pair Selection

In its broadest aspects, the invention is unlimited as to the particular functional adsorbent material and adsorbate (refrigerant) employed. In fact, it is contemplated that in an appropriate case an absorbent/absorbate pair may be used. However, adsorption is preferred over absorption for the following reasons.

1. In the transfer of refrigerant from one vessel to another, with adsorption, only one substance is transported. In absorption systems, e.g., ammonia/water or sulfur dioxide/water, the refrigerant always travels as a binary vapor. Eventually, the accumulation of absorbent material in the evaporator (chamber II) becomes so large that it underminds the operation of the device. Thus, the absorbent must be periodically drained from the evaporator and returned to the absorber (chamber I). While it is obvious that provision could be made for automatically conducting this step, it is a nuisance and is not necessary in an adsorption system.

2. Adsorption is intrinsically a very rapid process. Given adequate rates of transfer of heat and vapor in the adsorbent material bed, the net speed of adsorption is very rapid. This facilitates control and permits certain steps, such as the rapid flash evaporation required in the present cycle, which would be more difficult to carry out with absorption.

3. The heat of adsorption of a vapor on a solid is very large, usually 30–50% greater than the heat of vaporization of the liquid at the same temperature. This is highly advantageous in the design of a chemical heat pump because the net efficiency of the device increases as the ratio of the heat of adsorption to the heat capacity of the device increases. Stated differently, as much solar energy as possible should be utilized in the system to drive chemical effects and as little as possible absorbed as sensible heat.

4. Since adsorbent materials adsorb vapor at pressures which are much lower than the equilibrium pressure of the vapor above its own liquid or solid phase, adsorption systems permit ordinary liquids (e.g. water) to be reduced to very low pressures and temperatures. For example, the use of adsorption enables water to be employed as a working refrigerant for relatively low temperature refrigeration. This in turn allows ice to be formed by flash evaporation and results in heat storage both as heat of condensation and heat of fusion.

5. Adsorption, being generally a low pressure process, simplifies the design of chambers I and II for safety. This is a most significant consideration in product engineering and packaging since it results in implosion on failure. The silica gel/water based adsorption cycle discussed above operates at pressures in the vicinity of 1-2 in. Hg. This is even lower than the pressure necessary to pump fluid through a collector to collect heat in conventional solar systems.

While silica gel/water systems are the only ones discussed in detail herein, it is obvious that other adsorbent/adsorbate pairs can be used to advantage. Thermodynamic analysis of the cycle indicates that the selection of a particular pair should be based on a balancing of the following criteria, employing the weather conditions in the area in which the system will be used as a background.

The adsorbent/adsorbate pair should have a high capacity to adsorb. This is because the higher the capacity to adsorb, the greater will be the heat storage capacity. The pair should also have a heat of adsorption which declines rapidly with increased temperature. This enables the high temperature solar heat to desorb large amounts of vapor. The adsorbent material itself should have a low specific heat; sensible heat stored in the adsorbent, although recoverable, detracts from the efficiency of both the heating and cooling cycles. The adsorbate should have a high heat of vaporization. This permits the cycle to receive large quantities of heat at low temperature during the crucial process D'-A. Further, the selected adsorbent/adsorbate pair should have adsorption characteristics sufficient to permit the reequilibration of the sytem in stage D'-A to be self-sustaining. To achieve this goal, the heat of adsorption at moderate temperatures (in the vicinity of 100° F.) should be fairly large.

The refrigerant should also have saturation properties which would minimize the mass of liquid which must be vaporized in the flash cooling process. This requires that the change of enthalapy on vaporization be large compared with the change in enthalpy of saturated liquid over the desired range of temperature depression. This is desirable because the vapor which must be flashed during stage D-D' readsorbs in chamber I, and therefore limits the amount of refrigerant which can be readsorbed during stage D'-A. Lastly, it would be highly advantageous to select an adsorbent/adsorbate pair for which the isobars have very low slopes so that large changes in the concentration of adsorbed gas can be effected along isobars for only moderate changes in temperature. This also increases the capacity of the system to receive heat during the last stage of the cycle.

From the foregoing it should be apparent that a variety of different adsorbent/adsorbate pairs can be used as desired. No single pair will be found which satisfies all of the foregoing requirements; any pair actually employed will accordingly represent a compromise. The use to which the particular system is to be put, i.e., whether the unit will be used primarily for cooling or primarily for heating or more or less equally for both will necessarily affect this decision. Accordingly, adsorbent/adsorbate pairs such as silica gel/water, silica gel/sulfur dioxide, charcoal/sulfur dioxide, silver chloride/ammonia, and others may be used. Furthermore, it is contemplated that mixtures of two or more adsorbent materials and two or more adsorbates can be employed.

Modular Unit Embodying the System

As noted above, the storage of sensible heat in the system detracts from its performance. Thus, in the ideal, it would be preferable to have all heat stored as chemical effects such as adsorption or condensation and none as sensible heat. Accordingly, one important design criterion for any apparatus embodying the system is that it have a low internal heat capacity. Also, in conventional solar powered systems, the parts of the overall system are made by different manufactures and assembled or installed by different contractors. This complicates coordination of the construction and raises questions regarding who has the responsibility for ongoing maintenance and repair of the system. In view of this, an important design consideration for any apparatus embodying the invention is that it be sealed and self contained, amenable to mass production, and capable of being installed in units of varying capacity to suit various climatic conditions and buildings having different heating and cooling requirements.

In accordance with the invention, these goals are achieved if the apparatus described above is embodied as a modular unit, a number of which are combined to provide a given capacity. In addition to acting as both a heating and air conditioning device (or a refrigeration device), such a unit has inherent thermal storage and a built-in back-up energy source. Further, it serves as a solar collector and is made primarily from low cost materials such as glass. The unit can be factory built, tested, and shipped ready for connection to a power supply and duct system.

Figure 13:
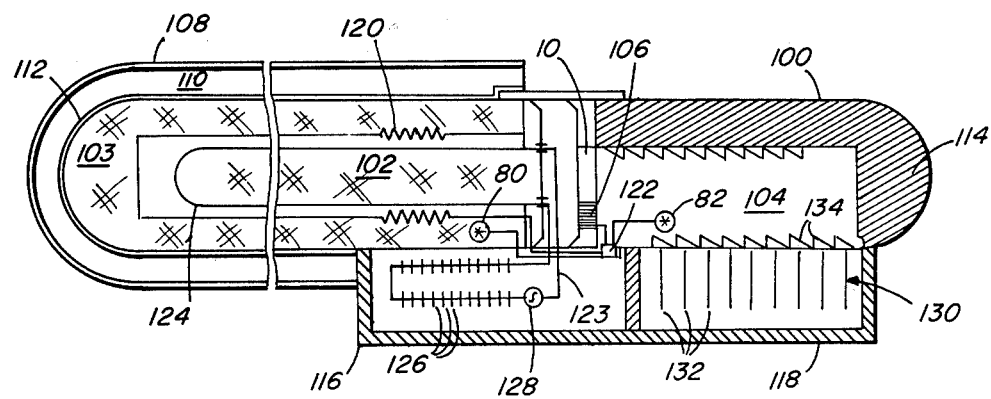
FIG. 13 is a longitudinal cross-sectional view of a modular unit embodying the apparatus of the invention capable of effecting both the heating and cooling cycles.

Referring to FIG. 13, one such modular unit embodying the invention is shown. It comprises an elongated tubular glass enclosure 100 defining a pair of chambers 102, 104, which, respectively, correspond to chambers I and II in FIGS. 1-11. The chambers are separated by a valve 10 which is actuated by a remotely controlled electromechanical solenoid 106. Chamber 102 is surrounded by a coaxially arranged glass tube 108. The annular space 110 is evacuated to minimize loss of heat by conduction or diffusion from chamber 102. The exterior surface 112 of chamber 102 is coated with a radiation absorptive material, and its interior is packed with adsorbent material 103, preferably silica gel. Temperature and pressure sensors 80, 82 are disposed respectively in chambers 102, 104. Chamber 102 also contains an electrical resistance back up heater 120. Leads for all electronic components enter through electrical lead-in 122. Chamber 104 is lined with an insulating material 114.

Ducts 116, 118 together double as a mounting for the unit and serve to provide thermal communication between the contents of tube 100 and outdoor or indoor air, as required. Duct 116 is placed in thermal communication with the adsorbent material 103 in chamber 102 by means of a heat exchanging loop 123 for circulating heat carrying fluid. The loop has a heat conducting structure disposed within chamber 102 of a nature hereinafter described, but here only schematically illustrated at 124. A series of fins 126 disposed within duct 116 serve as a heat exchange surface. Optionally, the loop includes a circulation pump 128.

Thermal communication between chamber 104 and duct 118 is established by means of a heat conducting structure 130 comprising a series of fins 132 disposed to contact air passing through duct 118 and a series of cup-like structures 134 for holding condensate. Fins 132 and structures 134 are made of copper or the like and are in thermal communication.

Figure 14:
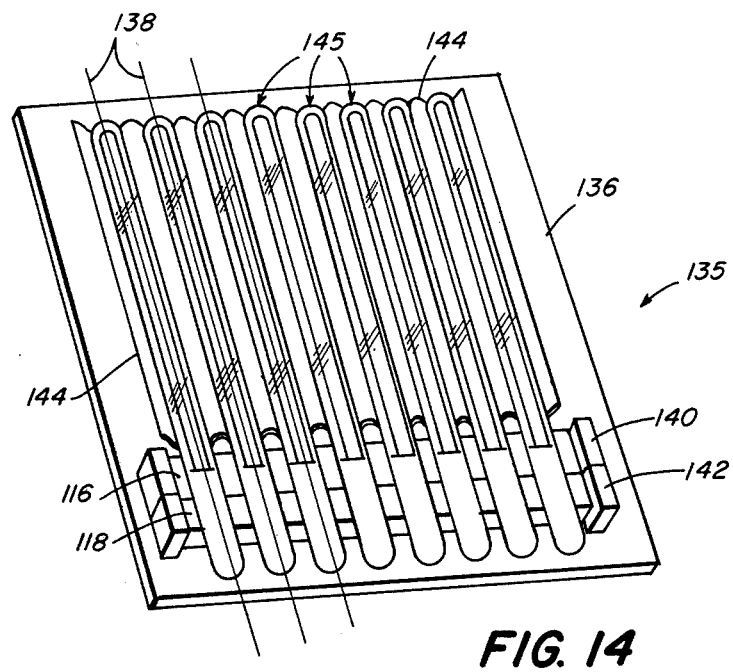
FIG. 14 illustrates apparatus comprising a diffuse light reflector and a plurality of the modules of FIG. 13 connected in series to a duct system to form a solar heating/cooling panel.
Figure 15:
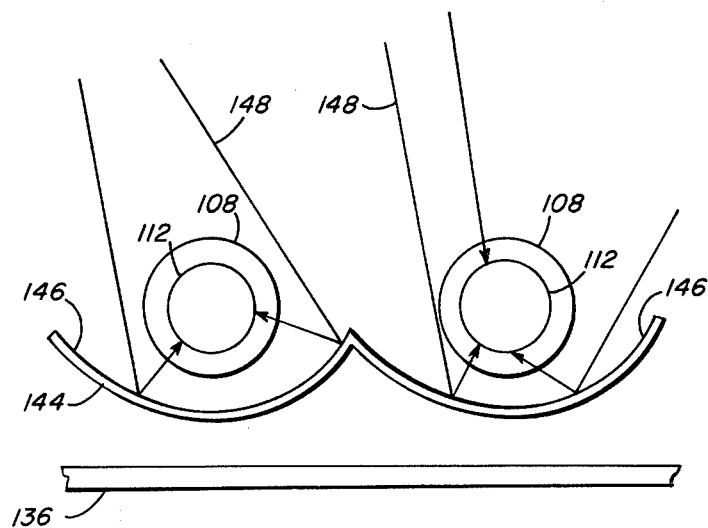
FIG. 15 is a fragmentary cross-sectional view of a portion of the panel of FIG. 4 illustrating how the diffuse light reflector simulates the performance of sun-following devices.

The mounting and cooperative relationship of a plurality of the modular units shown in FIG. 13 are illustrated in FIGS. 14 and 15. Preferably, a plurality of units arranged as a panel 135 are mounted on a base 136 with the central axes 138 of respective units in parallel and ducts 116, 118 connected in series. Ducts 116, 118 lead respectively to plenums 140, 142 which are connected in parallel with other plenums of identical design on other panels. One or more baffle systems (not shown) are used to direct either indoor or outdoor air as required along ducts 116, 118 at various stages of the cycle. A panel such as that depicted in FIG. 14 will have a certain minimum heating and cooling capacity. Accordingly, the number of such panels necessary to provide the space heating and/or cooling requirements of a given building structure located in a given geographical area can readily be calculated.

According to an important aspect of the invention, the panel includes a curvelinear diffuse light deflector 144 having plural specular reflecting surfaces 146 corresponding in cross-section to a segment of a cylinder positioned at the opposite side of the collector tube from the sun. This system improves the efficiency of total energy collection without tracking the sun or focusing the reflected radiation. Preferably, the tubes are no more than three diameters apart and the cylindrical reflector has its focal line within chamber 102. The radius of curvature of the reflector surface exceeds the radius of the tube and is defined as a function of the tube diameter and tube spacing. Further particulars concerning the construction and spatial relationship of reflector 144 and double-walled tubular solar energy collectors are disclosed in U.S. application Ser. No. 714,724 filed Aug. 16, 1976, entitled "Solar Energy Collection Apparatus", the disclosure of which is incorporated herein by reference.

Each modular unit 145 is capable of effecting both the heating and cooling cycle as described above. Briefly, the vapor pressure in chamber I is raised and desorption of vapor powered by solar radiation 148 absorbed by coating 112. With a stream of air passing through duct 118 and with valve 10 open, refrigerant vapor (preferably water) desorbs, passes through the valve, and is condensed in cup structures 134, its heat of condensation being removed via fins 132 and delivered as warm air to the interior of the building. When insolation ceases, valve 10 is closed, pump 128 is actuated to circulate cooling fluid e.g., fluorocarbon refrigerant, through cooling loop 124, and air is passed along duct 116. When sufficient heat has been removed from chamber 102 through the cooling loop to lower the refrigerant vapor pressure to a desired level, with no air passing through duct 118 (so that chamber 104 is isolated), solenoid 106 opens valve 10. The aqueous condensate in cup structures 134 undergoes flash evaporation and is thereby frozen. Heat of adsorption generated as the refrigerant readsorbs into silica gel adsorbent 103 during flash evaporation is removed through duct 116 and used to heat the building. Next, outdoor air is passed through duct 118 and is cooled as it gives up heat through fins 132 to the ice contained in cup structures 134 to provide heat of sublimation. The vapor then migrates through the valve 10 and is adsorbed, its heat of condensation being removed through cooling loop 122. By varying the rate at which cooling fluid is passed through loop 122 and/or by varying the volume of air circulated about fins 126 in duct 116, the vapor pressure within chamber 102 can be maintained at a substantially constant level during readsorption of the refrigerant vapor. If, during latter portions of the last stage of the cycle, booster heating is required to maintain the temperature of the incoming air, such heating can be accomplished with a booster heater downstream of duct 116 and plenum 140 (not shown).

From the foregoing it can be appreciated that individual modular units 145 can be mass produced, factory tested, and assembled into panels such as those depicted in FIG. 14. A plurality of panels when connected to the forced hot air system of a building, or, if a pipe system were substituted for the duct system illustrated, the forced hot water system of a building, can provide all necessary heating and cooling requirements.

Advantageously, the units efficiently collect sunlight and have only one or two moving parts. Valve 10 and its actuating mechanism cannot be dispensed with. However, pump 128 of cooling loop 122 may not be required unless it is desired to utilize the constant vapor pressure readsorption feature of the process of the invention. In any event, it will be possible to controllably exchange heat with adsorbent material 103 merely by varying the quantity of air passed through duct 116 and over fins 126.

Another significant advantage of the modular unit described above is that it is adaptable for use with various adsorbent/adsorbate pairs which, per unit volume of adsorbent material, require varying quantities of heat to desorb the refrigerant. For example, a solar collector comprising a pair of coaxially arranged tubes and an evacuated annular space is commercially available under the trademark SUNPAC from Owens Illinois Corp. This tube has a 1.75 inch inside diameter and is 48 inches long. Its interior volume is $6.68 \times 10^{-2}$ ft$^3$. Assuming that it is possible to fill 85% of this volume with adsorbent material, approximately 2.55 pounds of silica gel could be placed in the tube. This mass of silica gel, saturated with water, can be completely desorbed with 452 BTU of insolation. However, the SUNPAC tube is capable of collecting 1000 BTU per day or more. Its solar energy adsorptivity is maximized by the use of the diffuse light reflector and other novel design features, but is ultimately a function of the surface area of the inner tube, e.g., the surface area of tube 100.

In order to gain full advantage of the heat pump cycle disclosed here, it is necessary to increase the ratio of the capacities for adsorption to solar collection. For a tubular collector, this ratio goes as the ratio of interior volume to surface area and so behaves as the diameter of the tube. Thus, by using a larger diameter tube it is possible to match the capacities as required or to build in long term storage. For example, with a six inch inside diameter tube 48 inches long, it is possible to provide for energy storage of approximately 2.9 days of solar exposure within the system if silica gel is the adsorbent of choice. A tube of these dimensions can hold about 49 pounds of silica gel, which can use about 8620 BTU of energy. The tube will be able to collect about 3000 BTU solar heat per day. Thus, if no heat were required in the building during night-time, it would take 2.9 days before all the water was desorbed.

This type of storage is not directly comparable to storage of solar energy by other means such as thermal reservoirs. Specifically, storage in a conventional thermal reservoir (e.g. a tank of water) has as its first purpose to provide night-time heating. The system described above has this capability even when the amount of heat necessary to desorb all the gel is equal to one day's collecting capacity. The basic idea of long term storage (e.g., for more than one 24 hour period) is to collect insolation that is not needed in mild weather and to store it for use in more severe weather. In order to have this capability, the system must have the capacity to collect surplus solar energy. A collector tube with, for example, a capacity of 3 days worth of storage can actually store 3 days worth of solar energy if its condensate is not used during the night. Thus, simply by varying the diameter of the tube, it is possible to vary the ratio of the area of radiation absorptive surface (and thus solar energy absorption capacity) to the volume of the chamber (and thus the total amount of heat needed to desorb the gel) to achieve advantages. In any case the diameter should be no less than that necessary to result in efficient use of all solar heat collected. Preferably, the diameter is such that long term storage of the type discussed above is provided. When adsorbent materials other than silica gel are used, chamber 102 can nevertheless be readily sized in accordance with these teachings.

Heat and Mass Transfer Considerations

Proper operation of the foregoing apparatus depends upon the device's ability to carry out both heat and mass transfer at high rates. Analysis indicates that the rate limiting process in the cycle is internal heat transfer into and out of the adsorbent material. This heat transfer occurs by thermal diffusion, and thus the important property of the adsorbent is its thermal diffusivity $\alpha$. Diffusion distance D, over which a disturbance will travel into a medium by diffusion in time t is given by the formula:

$$D = \sqrt{\alpha t}$$

The significance of this distance is that if a change in temperature occurs in the boundary of a mass of silica gel of thickness h, and then when enough time elapses for the diffusion distance D to be approximately between h and 2h, the transient heat transfer will have become essentially complete. For silica gel, $\alpha = 84 \times 10^{-4}$ ft$^2$/hr: in five minutes, D=0.32 inches; in 10 minutes, D=0.45 inches; and in 15 minutes D=0.55 inches. If silica gel is the adsorbent of choice, it should be packed in chamber 102 in layers approximately $\frac{1}{4}$ to $\frac{1}{2}$ inch thick with each layer having access to a heat transfer surface of material of high thermal conductivity such as copper. With this design, it is possible to complete transient heat transfer through the silica gel to a thermal conductor in about 10-12 minutes. This time frame allows the various dynamic changes in the system to take place rapidly and results in an easily controlled, responsive device. When using other adsorbent materials of thermal diffusivity $\alpha$ ft$^2$/hr, the distance D between any point within the adsorbent material to a sheet of heat conducting material should therefore be $\leq \sqrt{0.2\alpha}$ (i.e., 12 minutes diffusion time) even more preferably, $D \leq \sqrt{0.12\alpha}$.

Within the range of vapor pressures and concentrations that occur in the cycles described, the transport of vapor into and out of the adsorbent bed occurs by diffusion. The rate of diffusion is the rate limiting step in the overall mass process, as the process of adsorption itself is instaneous compared with vapor migration. For transient diffusion of vapor in silica gel, the diffusivity of the gel $\alpha_v = 2.96$ ft$^2$/hr. Given that distance $\Delta = \sqrt{\alpha_v t}$, it can be seen that for silica gel, vapor will diffuse 6 inches in about 5 minutes, and will diffuse about three inches in 1.27 minutes. Accordingly, if the adsorbent material is arranged in chamber 102 such that vapor does not have to travel more than about 3 inches, the transient time for mass diffusion will be approximately 1$\frac{1}{4}$ minutes: mass diffusion taking place about 4 times as rapidly as thermal diffusion. For other adsorbent materials having a vapor diffusivity $\alpha_v$, the distance $\Delta$ between any point therein to a vapor flow path should be $\leq \sqrt{0.2\alpha_v}$. Mass diffusion from the adsorbent material to a vapor flow path will thus be complete in no more than about 12 minutes, and thermal and mass diffusion occur in about the same amounts of time. Preferably, $\Delta \leq \sqrt{0.033\alpha_v}$.

One structure which can achieve the foregoing dimensional requirements in the environment of chamber 102 of the modular unit depicted in FIG. 13 is set forth in FIG. 16-18. The adsorbent material is packaged as thin wafers between which thinner copper discs or sheets are placed. At least one edge of the wafer is exposed to a vapor flow path. Such a wafer, depicted in FIG. 18, has a thickness T no greater than $2\sqrt{0.2\alpha}$, where $\alpha$ is the thermal diffusivity of the adsorbent material in ft$^2$/hr. For silica gel, T is no greater than about one inch. Heat can therefore diffuse from any point within the wafer to a copper or other thermal conducting sheet material in contact with the wafer sides within about 12 minutes. The height H of the wafer, for adsorbent material of vapor diffusivity $\alpha_v$ ft$^2$/hr, should be no greater than about $2\sqrt{0.2\alpha_v}$, where both the top 150 and bottom 152 are in communication with a vapor flow path. If a vapor flow path is disposed at surface 150 only (bottom surface 152 terminates in a wall), then the height H should be no greater than $\sqrt{0.2\alpha_v}$ so that mass diffusion from any point in the adsorbent material wafer to the vapor flow path adjacent surface 150 is complete within about 12 minutes. For the silica gel/water system, H is preferably $\leq 3$ inches.

Referring to FIG. 16 and 17, a preferred heat conducting structure for use in chamber 102 of the modular unit of FIG. 13 is depicted. The structure consists of a can 154 comprising a cylindrical casing 156 traversed by a plurality of heat conducting separators or fins 158 which, in combination with the casing 156, define a plurality of wells 160. Each well holds a wafer of adsorbent material such as that shown in FIG. 18. The bottom of the can is closed. The outer surface of casing 156 is blackened to facilitate reception of heat from the walls 112 of the collector tube. The interior surface 162 of collector tube 112 is coated with a high emissivity material.

The can 154 has a plurality of cooling tubes 164 which serve the dual purposes of providing a channel for the circulation of fluid (schematically depicted in FIG. 13 as portion 124 of closed heat exchanging loop 122) and serving as connectors between cans axially arranged within chamber 102. As shown, each tube has a female frusto-conical section 166 and a male frusto-conical section 168 disposed at its opposite ends. The male and female sections sealingly interfit as illustrated in FIG. 17 to form four continuous channels. The cooling tubes are themselves made of copper or the like and are in good thermal contact with fins 158 and casing 156. It may be advantageous to employ a wire gauze 172, or other similar material, intermediate stacked cans 154, to give the unit further structural strength.

Male and female interfitting conical sections 166, 168, when fitted together as shown in FIG. 17, together comprise axial separating means which separate adjacent cans thereby to define a radial vapor flow path 170 between the cans. Further, female conical section 166 extends radially out from casing 156, and serves as a radial spacer for separating cans 154 from the interior surface 162 of tube 100. Thus, an annular space 174 defined between the outside surfaces of casings 156 of cans 154 and the interior surface of tube 100. The space extends axially along the tube, and serves as an axial vapor flow path.

In operation, thermal diffusion can occur from any point within the adsorbent material wafer to a heat conducting fin 158 at least within about 12 minutes. Mass diffusion of vapor, even from a point adjacent the bottom portion 152 of the wafers of the adsorbant material up to a vapor flow path 170, occurs in much less time. Vapor can thus migrate along radial flow paths 170 to axial flow path 174, and to the valve 10 of the modular unit. Also, heat can be removed from the adsorbent material by heat carrying fluid circulating along cooling tubes 164. Of course, the cooling tubes in the can adjacent the end of chamber 102 would be altered so that a closed loop is formed.

One of the barriers to exploiting the phenomenon of sublimation of ice below the triple point for low temperature refrigeration with water is the diffusion of heat into the ice. Thermal diffusion in ice is relatively slow compared with other heat transfer processes using conventional refrigeration. The thermal diffusivity of ice, $\alpha_{ice}$, is equal to $4.45 \times 10^{-2}$ ft$^2$/hr. Thus, if the ice is kept to about ½ inch depth, the time required to diffuse a thermal disturbance through it will be about 5.8 minutes. This time is comparable to the time required for thermal diffusion in silica gel in wafers dimensioned as set forth above. For other adsorbates of thermal diffusivity $\alpha_c$, the distance between a wall of the container holding the condensate and all points within the condensate should be $\leq \sqrt{0.2\alpha_c}$, preferably $\sqrt{0.12\alpha_c}$. In the modular unit disclosed in FIG. 13, these design features are embodied as a plurality of cup-like containers 134 made of heat conducting material such as copper which are coupled directly to fins 132. Each of the discrete containers 134 are open to the chamber 104 and thus the free flow of vapor is assured.

Sublimation of the ice, or volatilization of other refrigerants, and the heat transfer from the gel adsorbent material occur simultaneously in the respective chambers during any given stage of the cycle. In this process, both the sublimation and the extraction of heat from the silica gel are subject to external control. The net effect is that the response time of the system will be the longer of the response times of the two phenomena rather than the sum of these times. Accordingly, the thermal diffusion in the silica gel remains the rate limiting phenomenon in the operation of the system.

Uses and Modifications

From the foregoing discussion, it should be apparent that, without departing from the spirit and scope of the invention, many modifications can be made in the cycle itself, in the methods of exploiting the heating and/or cooling capacity of the cycle, in the degree of control to which the cycle can be subjected, in the nature of the apparatus in which the cycle takes place, and in the uses to which such a system can be put.

Thus, the cycle may be optimized for use in various climates by, for example, selecting a particular adsorbent/adsorbate pair, using intercooling with a cold air return stream during certain portions of the cycle, and taking other similar steps that will be apparent to those skilled in the art.

As mentioned above, various means for storing the cooling capacity generated in the system for use during periods of intense insolation, in addition to those set forth specifically above, will also be possible.

Some of the more important variations in the basic cycle involve control of various process steps to optimize thermodynamic efficiency. Thus, in chamber I, as noted above, vapor pressure can be regulated by controlling heat transfer so that adsorption and desorption occur at or close to constant vapor pressure, e.g., along lines R(B-C) and O(D'-A) of FIG. 12. In this way, the thermodynamic processes in the cycle occur efficiently under more or less reversible conditions. Another example of this aspect of the invention involves control of the valve 10 during or prior to stage D'-A so that the temperature of the condensed refrigerant in chamber II, and thus the temperature of evaporation, is maintained just slightly below (e.g., 10° F.) the then current temperature of the atmosphere. In this way, the temperature of evaporation can be maintained at optimal values relative to what will often be a changing atmosphere temperature. Also, during warm nighttime weather, valve 10 may be controlled to allow only so much vapor into chamber I as is needed to release the small amount of heat necessary to maintain the indoor temperature. Thus, condensate is conserved for use in future, more severe weather.

An apparatus for conducting the cycle need not necessarily take the form of the modular unit disclosed herein. In fact, in particular situations it may not necessarily be advantageous to exploit the system in modular form.

The primary focus of the foregoing discussion has been on space heating and cooling requirements. However, it is obvious that the system may be adapted without the exercise of invention to a variety of other applications. Nonlimiting examples include a building having a refrigerated section and a heated section. In this case, heat could be extracted from the refrigerated section while remaining portions of the building were supplied with heat. This could be accomplished in a single cycle merely by suitable redirecting air streams. Heat extracted from the refrigerated section not needed to maintain the temperature of the remainder of the building could be rejected to outside air; heat needed in excess of that removed from the refrigerated section to warm the building could be extracted from outside air. Another exemplary use for the process and apparatus of the invention is in providing refrigerating capacity for ocean going vessels such as fishing vessels. In this application, heat could advantageously be rejected directly into the relatively cold ocean water. It may also be useful to equip chamber II with an additional adsorption reservoir so that some of the heat of vaporization of the working fluid could be stored, rather than being transferred to the thermal sink to be warmed.

In attempting to build staged mechanical heat pumps to transfer heat over very large temperature differentials (for example 250° F.), it is ordinarily necessary to use multiple compressors, multiple heat exchangers, etc., all of which compound costs and maintenance. The intermittent chemical cycle disclosed herein offers a unique advantage for staging with very simple hardware as compared with mechanical devices. Thus, staging can be obtained as shown in FIG. 19 wherein the evaporator/condensor chamber II of a first system or stage 200 is built into the adsorber/desorber chamber I of a second system 202. Thus, the silica gel/water system described above could be directly coupled to a second system using, for example, silica gel and ethanol, for extracting heat from very low temperatures. Alternatively, it could be coupled to some other adsorbent/adsorbate system for delivering heat at very high temperatures. The coupling in this case would require only that the appropriate chamber of one system be immersed in its complementary vessel in the other system.

In the system depicted in FIG. 19, solar heat is used to desorb vapor in chamber I and the vapor is condensed in chamber II as usual. The heat of condensation of the vapor desorbs another vapor contained in adsorber/desorber chamber I in system 202, and that vapor is in turn condensed at low temperature in chamber II. When the process is reversed, the liquid (or solid) phase in chamber II' would receive heat from a low temperature reservoir, and the heat of readsorption ultimately generated in chamber I of system 200 would be delivered to the reservoir in which heat is desired. Such a staged system has certain practical advantages for additional storage, operation in very severe climates, or possibly for industrial heating.

Other embodiments are within the following claims.

What is claimed is:

1. A moldular unit powered primarily by solar radiation for heating and cooling a thermal sink, said unit being operable to execute an intermittent adsorption heat pump cycle and comprising:
   A. a sealed tubular enclosure having a valve positioned to separate first and second chambers defined by opposite ends of the interior of said tube;
   B. a tubular housing surrounding said first chamber, said housing being sealed to maintain a subatmospheric pressure zone between the tube and housing and being transparent to solar radiation;
   C. a solid adsorbent material disposed in said first chamber;
   D. a refrigerant comprising a condensible adsorbate contained within said enclosure;
   E. means for thermally coupling a heat distribution system of the thermal sink to said chambers comprising first and second conduit sections for connection with fluid circulation conduits which communicate with the sink;
   F. a first heat exchanger having a heat transfer surface within said first chamber in contact with said adsorbent material and a heat transfer surface in said first conduit section of said coupling means;
   G. a second heat exchanger for exchanging heat between said second chamber and said second conduit section of said coupling means;
   H. temperature and pressure sensors disposed within said first and second chambers; and
   I. means for electrically coupling said sensors and the valve to a control.

2. The unit of claim 1 wherein said housing is coaxially arranged with the first chamber and the portion of said tubular enclosure defining said first chamber has an exterior surface coating of solar radiation absorptive material.

3. The unit of claim 1 wherein said first heat exchanger comprises a closed loop for circulating heat carrying fluid.

4. The unit of claim 3 wherein said first heat exchanger includes a circulation pump.

5. The unit of claim 1 further comprising a diffuse light reflector separated from said housing and disposed opposite the side of said housing exposed to the sun.

6. The unit of claim 5 wherein said reflector comprises an elongated, concave, specular reflecting surface corresponding to a segment of a cylinder having its focal line within the volume of said first chamber.

7. A device comprising a plurality of the units of claim 1 arranged such that all said first conduit sections are in communication and all said second conduit sections are in communication, said device further comprising a diffuse light reflector separated from said housings and disposed opposite the sides of said housing exposed to the sun.

8. The device of claim 7 wherein the reflector comprises a corresponding plurality of elongated, concave, specular reflecting surfaces corresponding to cylinder segments having respective focal lines within the volume of respective first chambers.

9. The unit of claim 1 wherein said first and second conduit sections comprise duct sections.

10. The unit of claim 1 wherein said second heat exchanger comprises a heat conducting metal structure having heat transfer surfaces disposed within said second chamber and within said second conduit section.

11. The unit of claim 1 wherein said enclosure and said housing comprise glass.

12. The unit of claim 1 wherein said adsorbent material is silica gel.

13. The unit of claim 12 wherein said adsorbate is water.

14. The unit of claim 1 wherein said first chamber has a diameter such that the surface area and the volume of said first chamber are fixed so that the quantity of heat that can be collected during one day's solar exposure is no greater than the amount of heat necessary to desorb substantially all the adsorbate that can be adsorbed on a selected adsorbent material contained within said volume.

15. The unit of claim 14 wherein the adsorbent material is silica gel, the adsorbate is water, and the inside diameter of said first chamber is about six inches.

16. The unit of claim 14 wherein the diameter of said first chamber is such that it has insufficient absorptive capacity to desorb all the adsorbent contained within the volume of said first chamber so that the unit has a solar energy storage capacity.

* * * * *

UNITED STATES PATENT AND TRADEMARK OFFICE
CERTIFICATE OF CORRECTION

PATENT NO. : 4,199,952
DATED : April 29, 1980
INVENTOR(S) : Charles A. Berg

Figure 4:
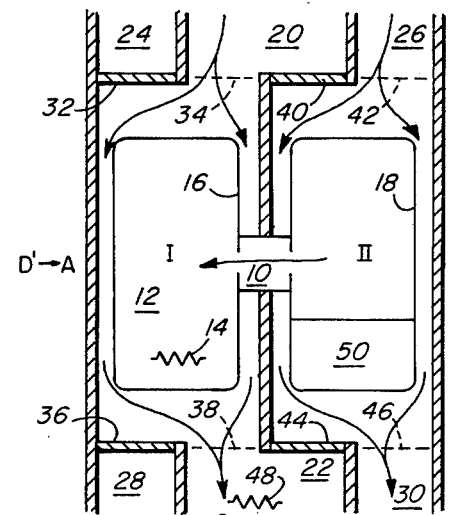

It is certified that error appears in the above-identified patent and that said Letters Patent are hereby corrected as shown below:

Column 1, line 46 "disadvantge" should read --disadvantage--
Column 4, line 62 "Fig. 4" should read --Fig. 14--
Column 7, line 5 "memers" should read --members--
Column 8, line 53 "exists" should read --exits--
Column 10, under Table 1 under Comment "get" should read --gel--
Column 13, line 28 "state" should read --stage--
Column 17, line 40 "sytem" should read --system--
Column 18, line 16 "manufactures" should read --manufacturers--
Column 20, line 13 "plenium" should read --plenum--
Column 21, line 13 "collect" should be underlined or emphasized on our copy it is underlined
Column 22, line 3 "instaneous" should read --instantaneous--
Column 22, line 36 (in one instance)
Column 23, line 44 (in both instances) ) no line over figures within square root sign
Column 25, line 35 "moldular" should read --modular--

Signed and Sealed this

Eighteenth Day of November 1980

[SEAL]

Attest:

SIDNEY A. DIAMOND

Attesting Officer    Commissioner of Patents and Trademarks

UNITED STATES PATENT AND TRADEMARK OFFICE
CERTIFICATE OF CORRECTION

PATENT NO. : 4,199,952
DATED : April 29, 1980
INVENTOR(S) : Charles A. Berg

It is certified that error appears in the above-identified patent and that said Letters Patent are hereby corrected as shown below:

Column 1, line 46 "disadvantge" should read --disadvantage--
Column 7, line 5 "memers" should read --members--
Column 10, under Table 1 under Comment "get" should read --gel--
Column 17, line 40 "sytem" should read --system--
Column 18, line 16 "manufactures" should read --manufacturers--
Column 20, line 13 "plenium" should read --plenum--
Column 21, line 13 "collect" should be underlined or emphasized on our copy it is underlined
Column 22, line 3 "instaneous" should read--instantaneous--
Column 25, line 35 "moldular" should read --modular--

Signed and Sealed this

Thirtieth Day of December 1980

[SEAL]

Attest:

SIDNEY A. DIAMOND

Attesting Officer

Commissioner of Patents and Trademarks